UNITED STATES PATENT OFFICE.

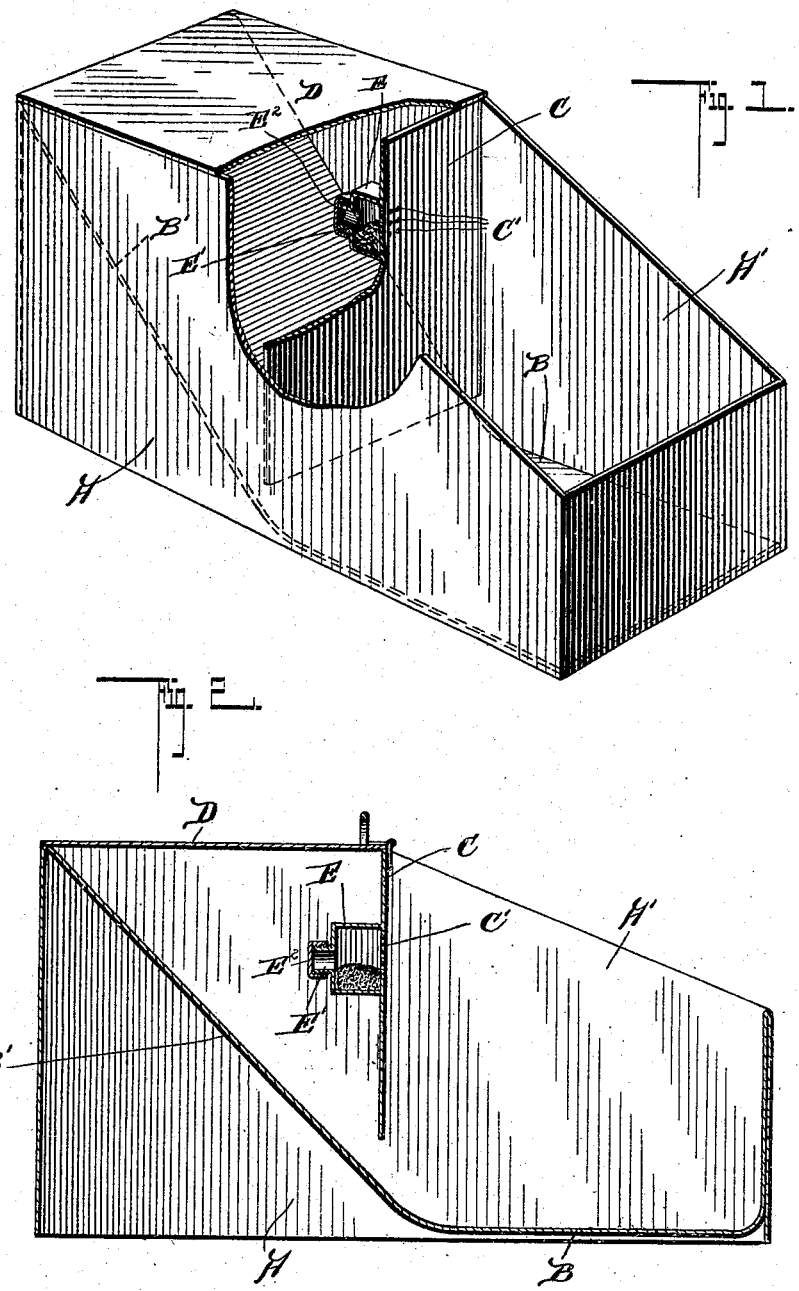

ALFRED D. MYERS, OF COLCHESTER, ILLINOIS.

FEED-BOX.

939,533.  Specification of Letters Patent.  Patented Nov. 9, 1909.

Application filed December 8, 1908. Serial No. 466,434.

*To all whom it may concern:*

Be it known that I, ALFRED D. MYERS, a citizen of the United States, residing at Colchester, in the county of McDonough and State of Illinois, have invented a new and useful Improvement in a Feed-Box, of which the following is a specification.

This invention relates to feed boxes, the object being to provide a feed box which is so constructed that only a portion of the feed will be in such a position that it can be reached by the animal at one time.

Another object of my invention is to provide a holder in connection with the feed box for holding a disinfectant or medicine which will give forth an odor so that the animal eating will inhale the same.

A further object of the invention is to provide a feed box which is exceedingly simple and cheap in construction and one which is provided with a hopper in which the feed is placed, said hopper being so connected to the feed box proper that the feed within the hopper will be fed into the feed box as it is removed.

With these objects in view, my invention consists in the novel features of construction hereinafter fully described, pointed out in the claims and shown in the accompanying drawings, in which:—

Figure 1 is a perspective view of my improved feed box, partly broken away. Fig. 2 is a longitudinal sectional view.

In carrying out my improved invention, I employ a rectangular shaped box A one end of which is cut away as clearly shown at A' and arranged within the box is a bottom B having an inclined portion B' forming the bottom of a hopper portion as will be hereinafter fully described, and the horizontal portion of the bottom forms the bottom of the feed box proper. A partition C is arranged within the box and is of such a length that when placed therein a small opening will be left at the bottom between the inclined bottom of the hopper and this partition serves the purpose of dividing the hopper from the feed box and it will be seen that by placing feed within the hopper, it will gradually pass out under the partition into the feed box proper as it is eaten up by the animal so that only a small portion of the feed is in the feed box proper at one time thereby preventing the animal from wasting the same. The hopper portion is closed by a hinged lid D so as to prevent the animal from reaching the same. This box is preferably formed of sheet metal, but it is of course understood that it can be formed of any suitable material desired, but I have found by practice that a sheet metal box has great advantages over other materials as it is more easily kept clean.

The partition C is provided with a plurality of openings C' over which is arranged a vessel E within the hopper having a nozzle E' which is closed by a threaded cap $E^2$. This vessel is adapted to be filled with disinfectant or medicine which will give forth an odor so that as the horse is eating he will inhale the same. It will be seen by this arrangement that the box will be thoroughly disinfected so that all danger of an animal eating out of the same catching a disease is prevented. It will also be seen that this feed box can be used with great advantages for causing the animal to inhale odors from medicine for colds and the like.

Having thus fully described my invention, what I claim as new and desire to secure by Letters Patent, is:—

1. A feed box comprising a rectangular shaped box having one end cut away, a bottom arranged within the box having an inclined portion, a partition arranged within the box over the lower end of the inclined portions of the bottom said partition being provided with a plurality of perforations, a cover for closing one end of the box and a vessel arranged over the perforations of the partition within the closed portion of the box having a nozzle, a cap for closing said nozzle, said vessel being adapted to contain medicine whereby the same will be inhaled by an animal as he eats out of the box.

2. A feed box provided with a bottom, having an inclined portion, a partition arranged within said feed box forming a hopper, and a feed box proper, said hopper being closed by a hinged lid, said partition having openings formed therein, and a vessel arranged over said openings within said hopper for holding medicine.

ALFRED D. MYERS.

Witnesses:
I. N. BOYD,
ED. R. McLEAN.